Figure 1:
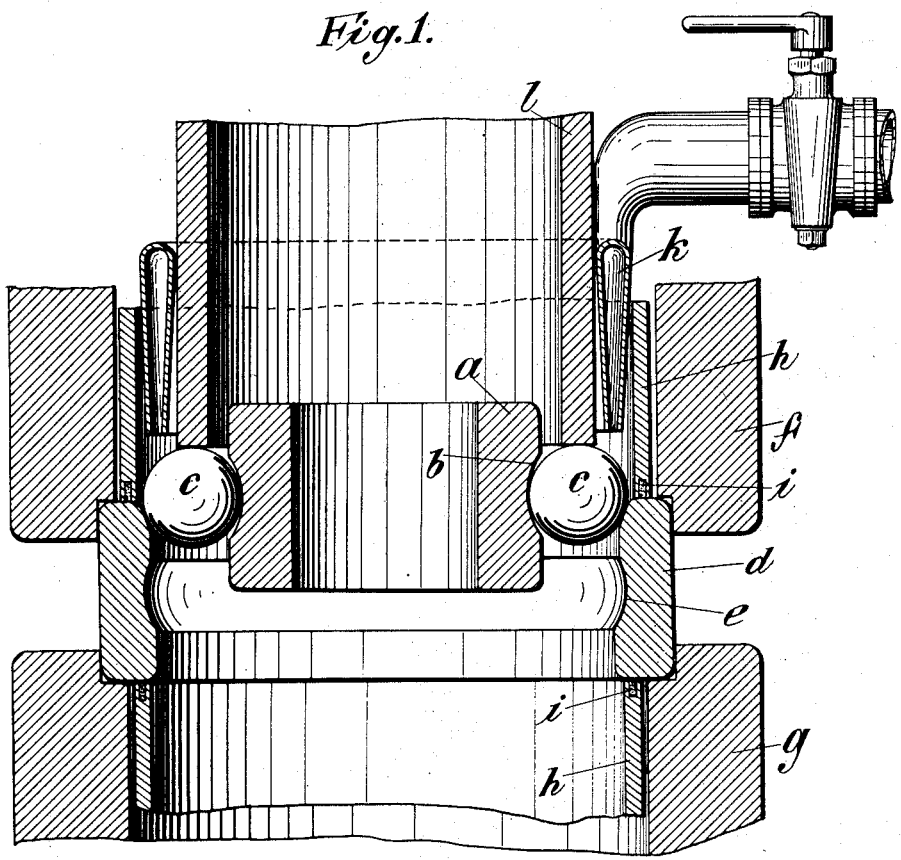

No. 881,471. PATENTED MAR. 10, 1908.
E. G. HOFFMANN.
METHOD OF MANUFACTURING AND ASSEMBLING BALL BEARINGS.
APPLICATION FILED JUNE 13, 1907.

3 SHEETS—SHEET 1.

WITNESSES
INVENTOR
Ernst Gustav Hoffmann
BY
Redding, Kiddle & Greeley
ATTORNEYS

No. 881,471. PATENTED MAR. 10, 1908.
E. G. HOFFMANN.
METHOD OF MANUFACTURING AND ASSEMBLING BALL BEARINGS.
APPLICATION FILED JUNE 13, 1907.
3 SHEETS—SHEET 2.
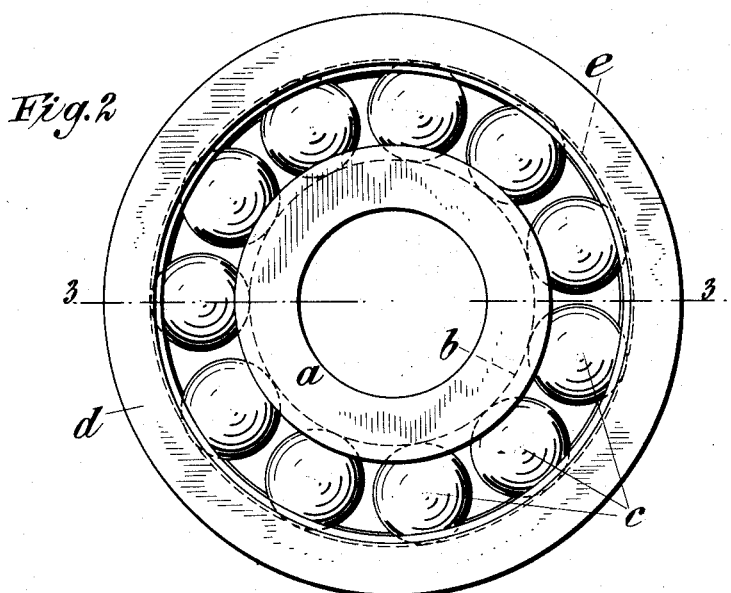
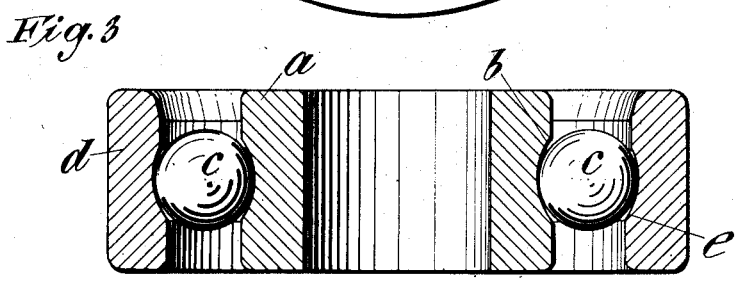
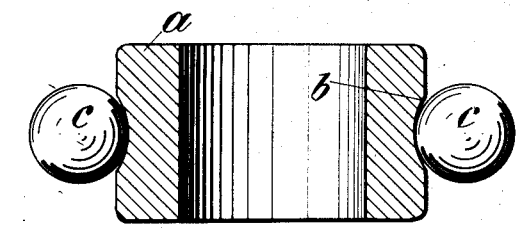
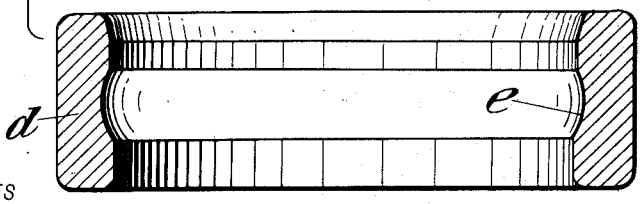
WITNESSES
INVENTOR
Ernst Gustav Hoffmann
BY
Redding, Kiddle & Greeley
ATTORNEYS No. 881,471. PATENTED MAR. 10, 1908.
E. G. HOFFMANN.
METHOD OF MANUFACTURING AND ASSEMBLING BALL BEARINGS.
APPLICATION FILED JUNE 13, 1907.
3 SHEETS—SHEET 3.
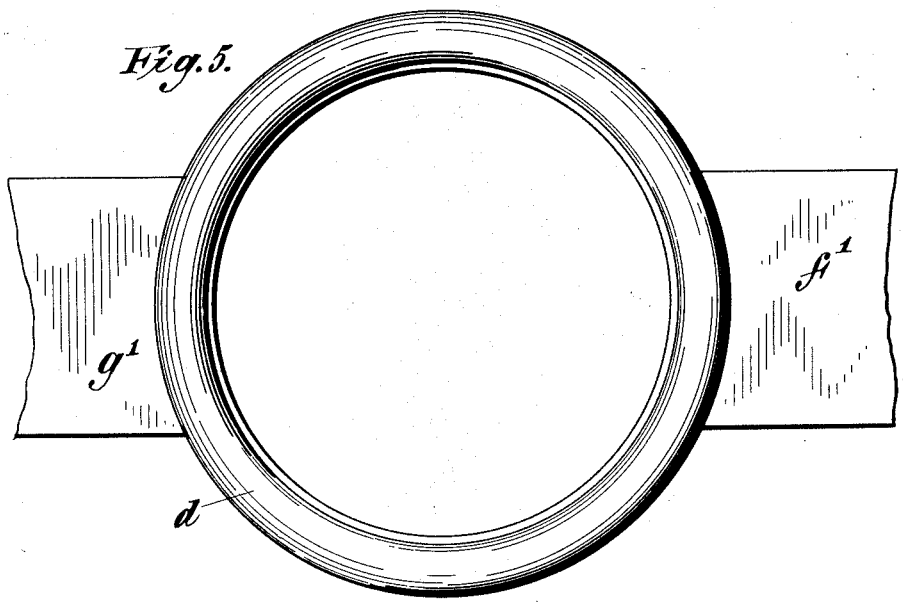
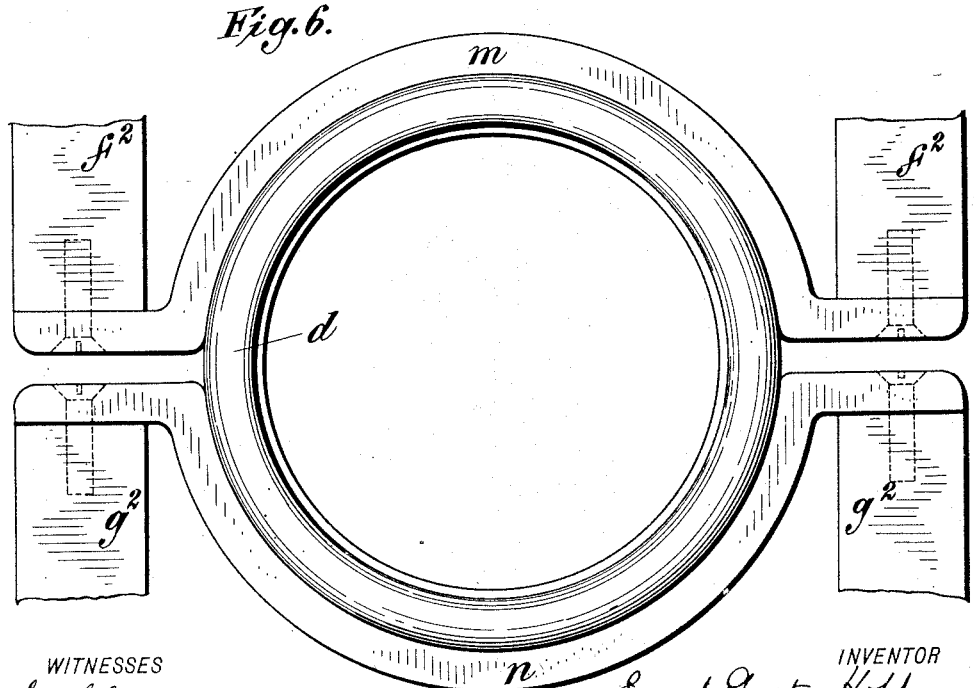

UNITED STATES PATENT OFFICE.

ERNST GUSTAV HOFFMANN, OF NEW ROCHELLE, NEW YORK.

METHOD OF MANUFACTURING AND ASSEMBLING BALL-BEARINGS.

No. 881,471.    Specification of Letters Patent.    Patented March 10, 1908.

Application filed June 13, 1907. Serial No. 378,699.

*To all whom it may concern:*

Be it known that I, ERNST GUSTAV HOFFMANN, a citizen of the United States, residing in the city of New Rochelle, in the county of Westchester, in the State of New York, have invented certain new and useful Improvements in Methods of Manufacturing and Assembling Ball-Bearings, of which the following is a specification, reference being had to the accompanying drawings, forming a part hereof.

The desirability of providing, in ball or roller bearings, uninterrupted race ways, that is, race ways which have no break in their continuity, such as would be caused by a slot or notch, whether filled by a filling piece or not, or any line of separation, has long been recognized and various attempts have been made to meet the demand for such a bearing.

It has been proposed, for example, to provide uninterrupted and integral grooved race ways and by displacing them eccentrically in the same plane to form a crescent shaped opening in which a limited number of the balls can be introduced, the balls subsequently being distributed uniformly and held apart by separator or spacing devices, but the limited number of balls which can thus be introduced causes the bearings which are so produced to fall far short of the ideal bearing. It has also been proposed to provide uninterrupted and integral grooved race ways and, after placing one within the other but with the axes oblique, to force the race ways and balls into the same plane in a suitable press, but this procedure invariably mutilates the race ways and distorts the balls more or less, so that the bearing produced is imperfect.

By the present invention it has been sought to produce a ball or roller bearing with uninterrupted and integral grooved race ways and with the full number of balls or rollers, that is the maximum number which can be lodged in the available space, and without any mutilation, permanent distortion or other injury to any of the members of the bearing.

In accordance with the invention the outer race way is rapidly expanded by the application of such an electric current as is employed in electric welding while the temper of the working surface is practically unaffected by heat, and at the instant of maximum expansion the two race ways and the balls or rollers are moved into the same plane. The outer race way is immediately cooled and by its contraction the balls or rollers are embraced between the walls of the grooves of the two race ways. In this manner neither the inner race way nor the balls are heated appreciably and, if the operation is properly conducted, the working surface of the outer race way is not sufficiently heated to affect its temper or finish. Moreover, being uniformly heated by the electric current, the outer race way suffers no permanent distortion. If the depth of the grooves with relation to the size of the balls and the dimensions of the race ways is properly predetermined, the accuracy or fit of the several members of the completed bearing leaves nothing to be desired.

The invention will be more fully explained hereinafter with reference to the accompanying drawings in which is illustrated apparatus suitable for the practice of the invention, and in which—

Figure 1 is a view in vertical central section of an apparatus, including the members of the bearing, which is suitable for the practice of the invention, the parts being shown in the positions which they occupy just before complete assembling. Fig. 2 is a plan view of a bearing produced by the improved method. Fig. 3 is a view in section on the plane indicated by the broken line 3—3 of Fig. 2. Fig. 4 is a view similar to Fig. 3 but with the ball races separated. Figs. 5 and 6 are plan views illustrating different modes of applying the electric current for the purpose of expanding the outer race way.

In the drawings the bearing is shown as comprising an inner, uninterrupted, integral race way $a$, having formed circumferentially on its outer surface a shallow groove $b$ of such depth as to prevent lateral displacement of the balls when the bearing is assembled; balls $c$ of the full number, that is of the maximum number capable of being lodged in the available space; and an outer, uninterrupted, integral race way $d$ having formed circumferentially, in its inner surface, a shallow groove $e$, also of sufficient depth to prevent lateral displacement of the balls when the bearing is assembled. All of these parts of the bearing are prepared and completely finished in readiness for the application of the present invention. The outer race way $e$, supported in proper position, preferably with its axis vertical, is then subjected, either directly or indirectly, to the action of an electric current which is preferably of low tension and great volume, such as is ordinarily employed in electric welding.

As shown in Fig. 1, the race way $d$ is mounted between and in contact with two annular electrodes or terminals $f$ and $g$ of a suitable electric circuit, so that in this case the current flows through the race way or ring $d$ in a direction parallel with the axis of the ring. Annular shields $h$, provided if desired with suitable packing $i$, are pressed against the ends of the ring $d$ not only incidentally to protect the inner race way or ring $a$ and the balls from heat radiated by the electrodes or terminals $f$ and $g$, but mainly to protect the latter as well as the main body of the ring $d$ from the action of the cooling medium which may be supplied, during the operation, through an annular nozzle $k$. In the apparatus shown there is also provided an annular plunger $l$.

When the parts of the apparatus and the bearing are in the position represented in Fig. 1 the electric current is turned on and instantly the body of the race way or ring $d$ is heated to an extent sufficient to permit the balls $c$, surrounding the inner race way or ring $a$, to pass the upper shoulder or side of the groove $e$ when pressed in the proper direction by the plunger $l$. The inner and outer race ways and the balls are thus brought into a common plane. The action of the electric current in producing the expansion of the outer ring or race way is so rapid that the temperature of the inner or working face of the ring is not raised to such a degree as to affect its temper and finish, especially if a cooling medium, such as cold water, is continuously applied to the inner face of the ring, as by the nozzle $k$. The electric current is cut off at the instant that the outer ring is expanded to the desired extent and the members of the bearing are brought into the common plane and the outer ring is immediately cooled by the continued flow of the cooling medium, contracting to its initial dimensions and causing the balls to be embraced between the walls of the grooves in such a manner as to prevent their lateral displacement. The balls and inner ring are entirely unaffected by the heating of the outer ring, both by reason of the brief period of time during which the outer ring is heated and by reason of the protection afforded by the cooling medium.

Obviously the outer ring or race way $d$ may be subjected in various ways to the action of the electric current. Thus, as shown in Fig. 5, the electric current may be made to pass circumferentially through the ring from the one electrode or terminal $f'$ to the other electrode or terminal $g'$ which are brought into contact with the outer circumferential surface of the ring. So also, as shown in Fig. 6, the electrodes $f^2$ and $g^2$ might be applied to metal bands or clamps $m$ and $n$ which are in contact with the ring circumferentially, so that the ring itself is heated by the current which passes through it and by immediate contact with the heated bands or clamps. Obviously also, the ring or race way may itself constitute the secondary coil of an electric transformer so that the electric current is produced therein by induction without electrical contact with the primary circuit.

Various other modes of applying the electric current will suggest themselves and it is to be understood that the invention is not restricted to the details of construction or arrangement of the apparatus which may be employed in the practice of the invention.

The invention, as will be readily apparent, is no less applicable to the separation of the members of such a ball bearing as that referred to, than to the assembling thereof. It frequently happens that ball bearings of this character must be taken apart for correction of defects and in such a case the outer ring is expanded by the application of an electric current, as already described, and at the instant of maximum expansion the inner ring and the balls are forced out. The claims herein are therefore to be understood as covering the separation as well as the bringing together of the members of the bearings.

I claim as my invention:

1. The method of manufacturing a ball bearing which consists in forming uninterrupted, integral inner and outer rings or race ways grooved respectively on the outer and inner circumferential faces to embrace the balls and prevent lateral displacement thereof when assembled, subjecting the body of the outer ring to an electric heating current while the working face thereof and the inner ring and the balls are maintained at a low temperature, moving the ring and balls relatively in the desired direction at the instant of maximum expansion to embrace or release the balls, and immediately cooling the outer ring to prevent the heating of its working face.

2. The method of manufacturing and assembling a ball bearing which consists in forming uninterrupted, integral inner and outer rings or race ways grooved respectively on the outer and inner circumferential faces to embrace the balls and prevent lateral displacement thereof when assembled, subjecting the body of the outer ring to an electric heating current while the working face thereof and the inner ring and balls are maintained at a low temperature, moving the rings and balls into the same plane at the instant of maximum expansion, and immediately cooling the outer ring to prevent the heating of its working face and to permit it to contract and cause the balls to be embraced in the grooves of the two rings.

This specification signed and witnessed this 12th day of June, A. D., 1907.

ERNST GUSTAV HOFFMANN.

Signed in the presence of—
H. L. PIERCE,
AMBROSE L. O'SHEA.